(12) United States Patent
Groth

(10) Patent No.: US 11,903,374 B1
(45) Date of Patent: Feb. 20, 2024

(54) ICE FISHING ROD HOLDING DEVICE

(71) Applicant: Thomas Groth, Merrill, WI (US)

(72) Inventor: Thomas Groth, Merrill, WI (US)

(*) Notice: Subject to any disclaimer, the term of this patent is extended or adjusted under 35 U.S.C. 154(b) by 0 days.

(21) Appl. No.: 17/950,362

(22) Filed: Sep. 22, 2022

(51) Int. Cl.
*A01K 97/01* (2006.01)
*A01K 97/10* (2006.01)
*A01K 97/12* (2006.01)

(52) U.S. Cl.
CPC .............. *A01K 97/10* (2013.01); *A01K 97/01* (2013.01); *A01K 97/12* (2013.01)

(58) Field of Classification Search
CPC ................................. A01K 97/01; A01K 97/12
See application file for complete search history.

(56) References Cited

U.S. PATENT DOCUMENTS

| | | | |
|---|---|---|---|
| 4,928,419 A | 5/1990 | Forrestal | |
| D467,988 S | 12/2002 | Kemper | |
| 7,032,343 B1 | 4/2006 | Foss | |
| 7,343,708 B2 | 3/2008 | Piecynski | |
| 8,176,672 B1 | 5/2012 | Schmeisser | |
| 8,701,333 B2 | 4/2014 | Christianson et al. | |
| 8,898,950 B1 | 12/2014 | West | |
| 9,095,130 B2 | 8/2015 | Coulson | |
| 9,974,294 B2 | 5/2018 | Reiter | |
| 10,524,460 B1 | 1/2020 | Konitzer et al. | |
| 10,631,530 B1 | 4/2020 | Peterman | |

OTHER PUBLICATIONS

Beaver Dam Jolly Roger Tip-Up. Product Listing [online]. © 2022 Thorne Bros Custom Rod & Tackle [retrieved on Dec. 8, 2020]. Retrieved from the Internet: <URL: https://www.thornebros.com/products/beaver-dam-jolly-roger-tip-up>.

*Primary Examiner* — Joshua J Michener
*Assistant Examiner* — Henry Hooper Mudd
(74) *Attorney, Agent, or Firm* — Cramer Patent & Design PLLC; Aaron R. Cramer

(57) ABSTRACT

An ice fishing rod holding device is an automatic fishing device having a U-shaped base, a fishing rod perpendicularly secured adjacent a base end opposite a U-shaped base cutout, and a pin assembly which retains the rod in a horizontal position until a fish strikes a bait secured to the end of the rod by a length of fishing line. Secured at the base of the rod is a flexible spring. Secured at the distal end of the rod are a pair of spheres. The device may emit an audible alarm when activated.

19 Claims, 7 Drawing Sheets

ICE FISHING ROD HOLDING DEVICE

RELATED APPLICATIONS

Non-applicable.

FIELD OF THE INVENTION

The present invention relates generally to a fishing rod holding device and more specifically to an ice fishing rod.

BACKGROUND OF THE INVENTION

The use of fishing tip up rigs during wintertime ice fishing is a common one. They allow fishermen the ability to fish from many different fishing holes at one time. The tip up provides for a reel system that properly places the hook at a location where fish will strike it and holds it there for hours while the fisherman attends to other tasks. Additionally, these tip-up rigs include a visual alarm and perhaps an audible alarm to alert the fisherman that a fish is on the line.

While such features are certainly much more practical than holding a fishing pole in place for minutes or hours, current solutions rely on "reeling" in a fish using only the line. This solution is cumbersome, time consuming, may result in the loss of the fish, and will require a cleanup of loose fishing line even if unsuccessful. Accordingly, there exists a need for a means by which the benefits of using a tip up rig and a fishing pole can be combined together to create a usable solution to catching fish when ice fishing. The development of the ice fishing rod holding device fulfills this need.

SUMMARY OF THE INVENTION

To achieve the above and other objectives, the present invention provides for an ice fishing rod holding device which has, a body having a slot disposed on a first end, a visual indicator disposed on an opposite end of the slot, a first swing arm disposed on a first side of the body, a second swing arm disposed on an opposite second end of the body, a support stanchion disposed on top of the body on one side of the slot, an attachment chain mechanically connected on top of the support stanchion at a first end and a second end of the attachment chain is connected to a trigger pin, a locking hook having a first end capable of being hooked on to the trigger pin and a second end capable of securing to a fishing line, a pin end of the trigger pin connected into one of ten release positions on a release panel, a spring cover freely resting on the body covering a spring portion of the visual indicator when the ice fishing rod holding device is in storage, and a rod having a first end affixed to the spring, the spring is an extension thereof.

The body includes a plurality of first apertures and a plurality of second apertures disposed thereon. The visual indicator includes a spring, a rod and at least one indicator balls. The first swing arm having a first side connected to the ice fishing rod holding device by a first pivot means through one of the first apertures or the second apertures, and the first swing arm moves along an arm swivel travel path. The second swing arm having a second end connected to the ice fishing rod holding device by a second pivot means through one of the desired of the first apertures or the second apertures, and the second swing arm moves along an arm swivel travel path. The support stanchion is attached to one of the second apertures. The release panel is attached to one of the first apertures.

The visual indicator may be bent over along a visual indicator travel path but secured in a clip during storage. The clip may be affixed to the body at one of the first apertures. The clip may include a base plate and a leaf spring that biases downward against the body and incorporates a geometry enabling retention of a portion of the visual indicator. The clip may include the base plate and a spring clip that biases downward against the body and incorporates the geometry enabling retention of the portion of the visual indicator. The visual indicator may include a spring which is attached to the body via one of the first apertures but located at an opposite side from the slot. The first pivot means may be selected from the group consisting of a rivet, a screw, a nut, or a thumbscrew. The opposite second end of the second swing arm may include a fishing rod holder adapted for holding a conventional fishing pole. The first and second swing arms may be motioned, and an opposite end of the arm swivel travel path and arm swivel travel path may reside against the body having a reduced overall footprint allowing for compact storage of the ice fishing rod holding device. The attachment chain connecting the trigger pin and the support stanchion may prevent accidental loss of the trigger pin. The first end may be capable of being hooked on to the trigger pin at its midpoint.

The visual indicator may be bent over along a visual indicator travel path and secured in place under the trigger pin connected to a release position. The release positions that are near the slot may have a lowered resistance to release and a quicker release at a given line pressure. The release positions nearer the visual indicator may have a higher resistance to release and a slower release at a given line pressure. The spring cover may be a cylindrical element with a pair of open ends. The opposing second end of the rod may be the at least one indicator balls and at least one audible alarm and the at least one indicator balls may be larger than the rod and may have a visually appealing color applied onto them. The audible alarm may be a striking element and a bell that creates an audible sound when motioned. The ice fishing rod holding device may be stored by hanging on a wall of an ice shanty, a fishing hut, a garage, or a storage shed via one of the first apertures. The ice fishing rod holding device may be stored in a five gallon pail for protection from damage.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
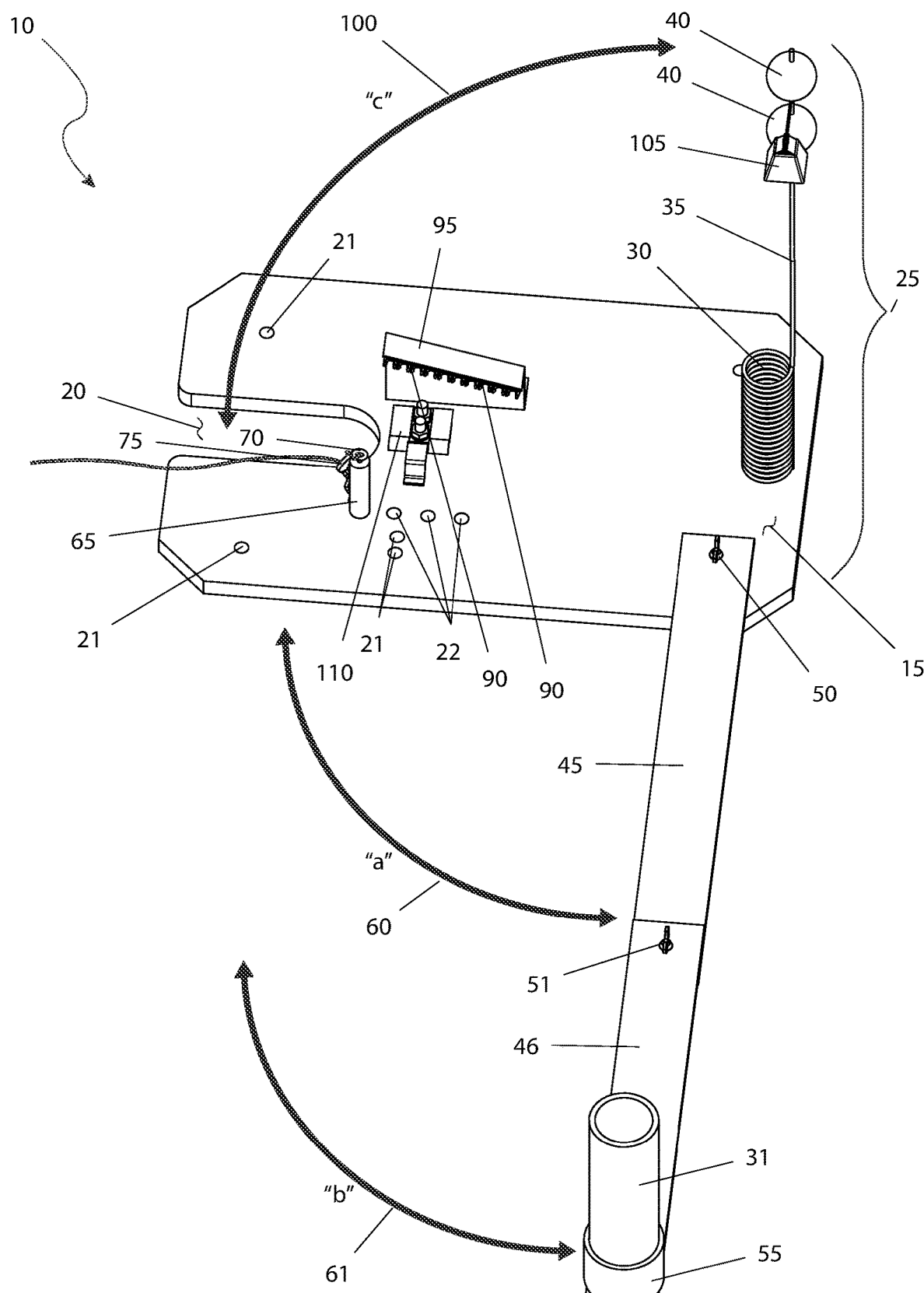
FIG. 1 is a perspective view of the ice fishing rod holding device, according to the preferred embodiment of the present invention.

DESCRIPTIVE KEY 10 ice fishing rod holding device
15 body
20 slot
21 first aperture
22 second aperture
25 visual indicator
30 spring
31 spring cover
35 rod
40 ball
45 first swing arm
46 second swing arm
50 first pivot means
51 second pivot means
55 fishing rod holder
60 arm swivel travel path "a"
61 arm swivel travel path "b"
65 support stanchion
70 attachment chain
75 trigger pin
80 locking hook
85 pin end
90 release position
95 release panel
100 visual indicator travel path "c"
105 audible alarm
110 clip
115 hole
120 ice
125 handle
130 fishing pole
135 fishing line
155 fish
165 user

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the ice fishing rod holding device 10, according to the preferred embodiment of the present invention is disclosed. The ice fishing rod holding device 10 (herein also described as the "device"), provides an ice-fishing tip-up rig with a means to utilize a removable conventional fishing pole 130 for reeling in the caught fish 155. The device 10 provides for a body 15 with a slot 20 at one (1) end as shown. The opposite end from the slot 20 is provided with a visual indicator 25, generally of a spring 30, a rod 35 and at least two (2) brightly colored balls 40. The body 15 incorporates a plurality of first apertures 21 and second apertures 22 located thereon, enabling adjustable positioning of the features of the device 10 thereon. The first apertures 21 may also function to enabling fastening of the device 10 directly on the surface of the ice 120.

Located on one (1) long side of the body 15 is a first swing arm 45 having a first side connected to the device 15 by a first pivot means 50 such as a rivet, screw, nut, thumbscrew, or the like, through any desired one (1) of the apertures 21. The opposite second end of the first swing arm 46 is attached to a first end of a second swing arm 46 with a second pivot means 51. The opposite second end of the second swing arm 46 is provided with a fishing rod holder 55 for holding of a conventional fishing pole 130 as will be described in greater detail herein below. The first swing arm 45 moves along an arm swivel travel path "a" 60. It is illustrated at a ninety-degree (90°) position relative to the body 15 as shown allows for utilization. The second swing arm 46 moves along an arm swivel travel path "b" 61. It is illustrated at a ninety-degree (180°) position relative to the body 15 as shown allows for utilization. When the first and second swing arms 45, 46 are motioned and the opposite ends of the arm swivel travel path "a" 60 and arm swivel travel path "b" 61 such that they reside against the body 15, it provides a reduced overall footprint allowing for compact storage of the device 10 (please see FIG. 6). It is envisioned that the device 10 could be stored by hanging on wall in an ice shanty, fishing hut, garage, storage shed or the like, also via any one (1) of the first apertures 21. The device 10 may also be stored in a five-gallon (5 Gal.) pail to protect it from damage.

Figure 2A:
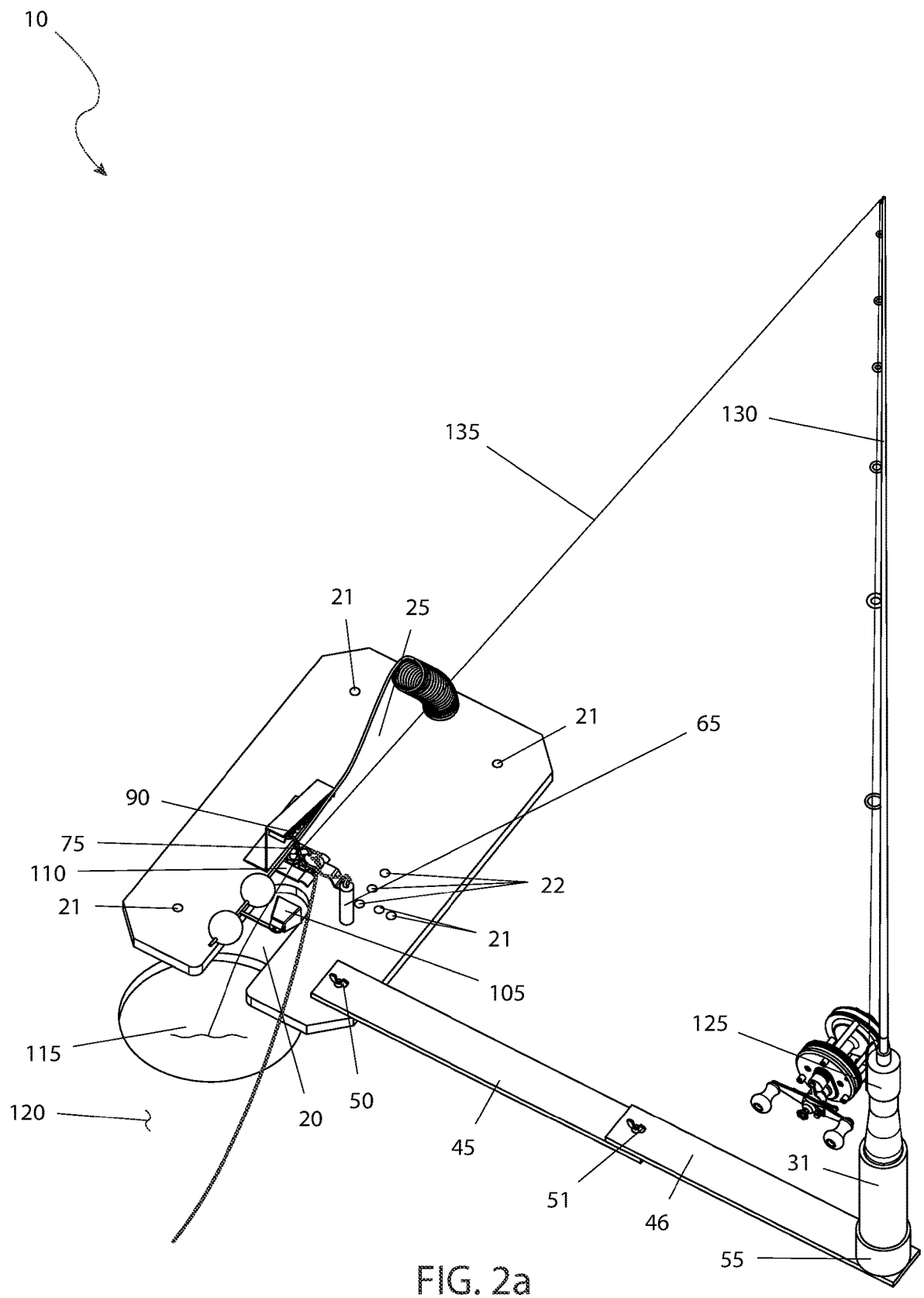
FIG. 2a is a perspective view of the ice fishing rod holding device, shown in a utilized, but pre-activated state, according to the preferred embodiment of the present invention.
Figure 2B:
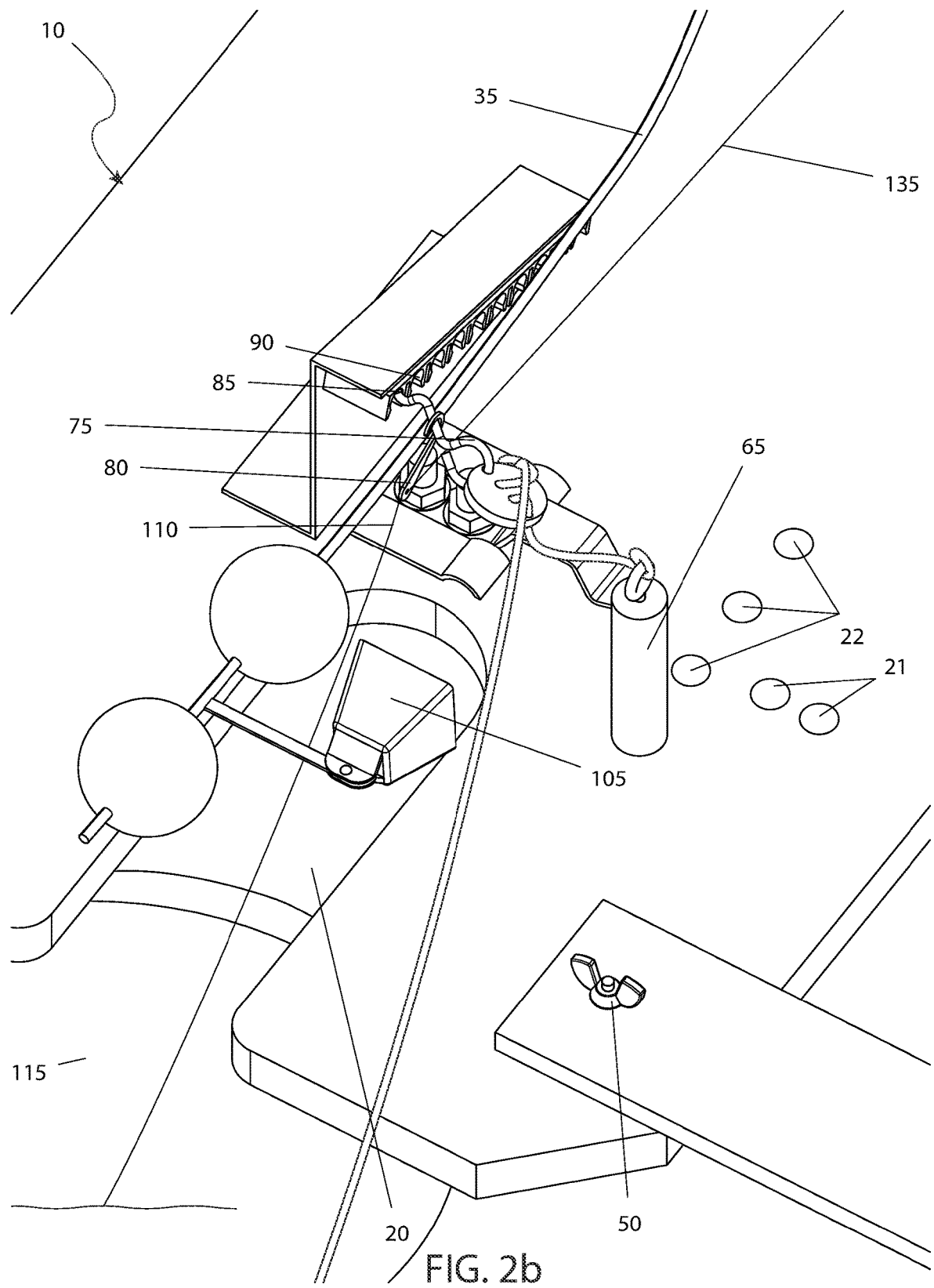
FIG. 2b is a close-up view of the ice fishing rod holding device, shown in a utilized, but pre-activated state, according to the preferred embodiment of the present invention.

Referring now more closely to FIGS. 2a and 2b, on top of the body 15 on one (1) side of the slot 20, a support stanchion 65 is provided and attached to any desired one (1) of the second apertures 22. One (1) end of an attachment chain 70 is mechanically connected to the top of the support stanchion 65. The opposite end of the attachment chain 70 is connected to a trigger pin 75. A locking hook 80 has a first end capable of being hooked on to the trigger pin 75 at its midpoint and a second end capable of securing to a fishing line 135 as will be shown herein below.

During utilization of the device 10, a pin end 85 of the trigger pin 75 will connect into one (1) of ten (10) release positions 90 on a release panel 95. The release panel 95 is attached to any desired one (1) of the first apertures 21. The release positions 90 that are near the slot 20 will have a lowered resistance to release, thus a quicker release at a given line pressure, while release positions 90 nearer the visual indicator 25 will have a higher resistance to release, thus a slower release at a given line pressure.

During preparation for use, the visual indicator 25 is bent over along a visual indicator travel path "c" 100 and secured in place under the trigger pin 75 connected to a release position 90. During storage, the visual indicator 25 can be bent over along a visual indicator travel path "c" 100 but secured in a clip 110 (please see FIG. 6). The clip 110 is affixed to the body 15 at any desired one (1) of the first apertures 21 and generally includes a base plate and a leaf spring or spring clip that biases downward against the body 15 and incorporates a geometry enabling retention of a portion of the visual indicator 25. A spring cover 31, preferably a cylindrical element with open ends to freely rest on the body 15, is provided to cover a spring 30 portion of the visual indicator 25 when the device 10 is in storage.

The device 10 is positioned next or at to a hole 115 in the ice 120 as shown. The spring cover 31 is removed from covering the spring 30 and can be fit into the fishing rod holder 55 on the second swing arm 46 in an upright position as shown. A handle 125 is inserted into the fishing rod holder 55 through the spring cover 31. Fishing line 135 from the fishing pole 130 is routed downward and through the second end of the locking hook 80, wherein the first end thereof is hooked onto the trigger pin 75. The fishing line 135 then continues downward through the slot 20 and into the hole 115. The distal end of the fishing line 135 is provided with customarily expected elements such as hooks, bait, sinkers, floats, and the like. Such elements are not illustrated herein due to illustrative limitations. As aforementioned described, the visual indicator 25 is bent over along the visual indicator travel path "c" 100 (as shown in FIG. 1) and secured in place under the trigger pin 75 connected to a release position 90. The configuration as shown in FIGS. 2a and 2b, is that of a device 10 in an exemplary in-use environment.

Figure 3:
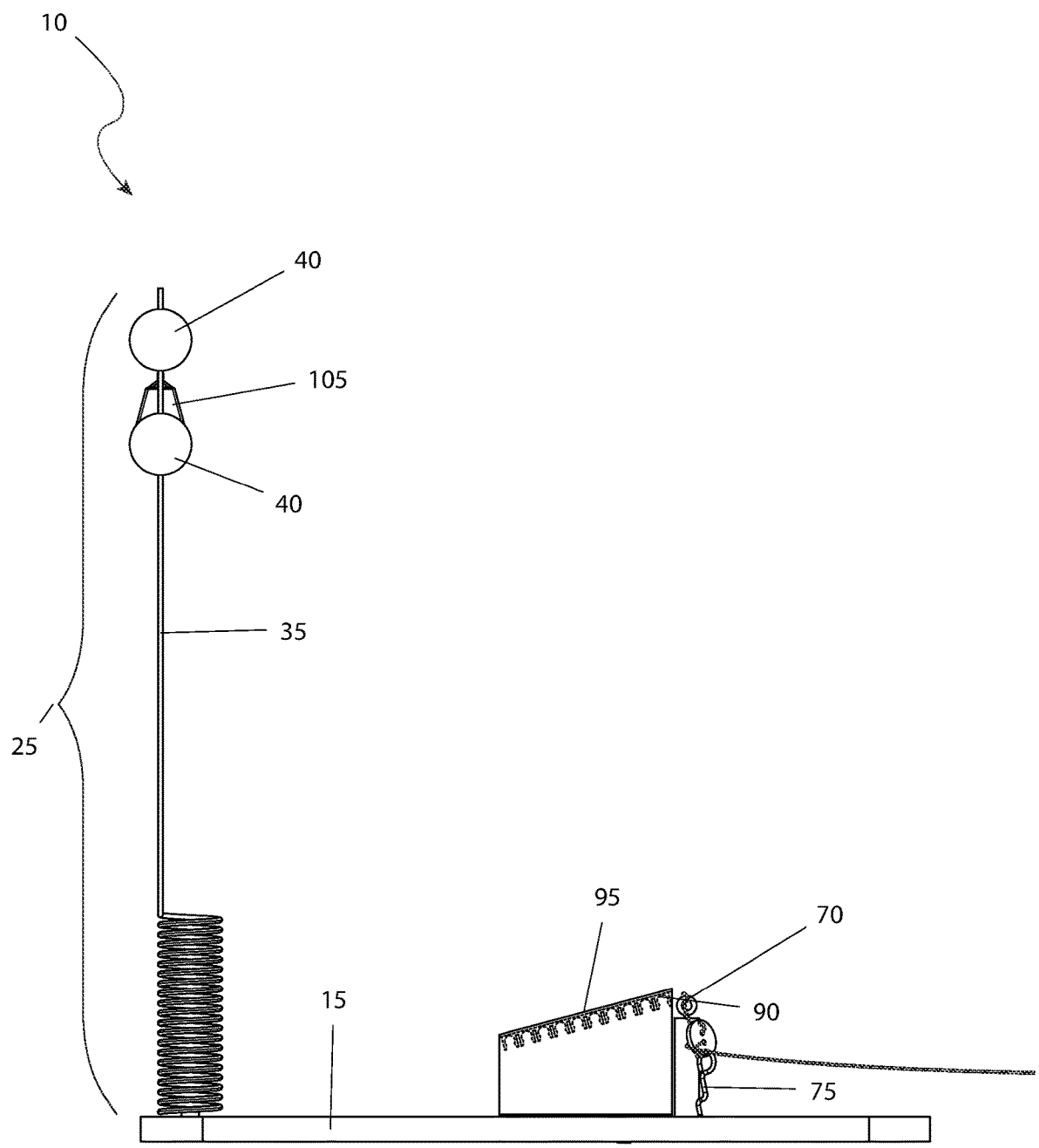
FIG. 3 is a side view of the ice fishing rod holding device, according to the preferred embodiment of the present invention.

Referring now to FIG. 3, a side view of the device 10, according to the preferred embodiment of the present invention is shown. The visual indicator 25 is depicted in an upright state, ninety-degrees (90°) to the body 15, in a post-activated position, awaiting reset for use. There are approximately ten (10) release positions 90 illustrated herein. The visual indicator 25 includes the spring 30 which is attached to the body 15 via any desired one (1) of the first apertures 21, but generally located at an opposite side from the slot 20. A rod 35 has a first end affixed to the spring 30 and is generally an extension thereof. Attached adjacent to the opposing second end of the rod 35 is at least one (1) ball 40 and at least one (1) audible alarm 105. The indicator balls 40 are large compared to the rod 35 and preferably have a visually appealing color applied thereto. The audible alarm 105 can be a device that involves a striking element and a bell that creates an audible sound when motioned.

Figure 4:
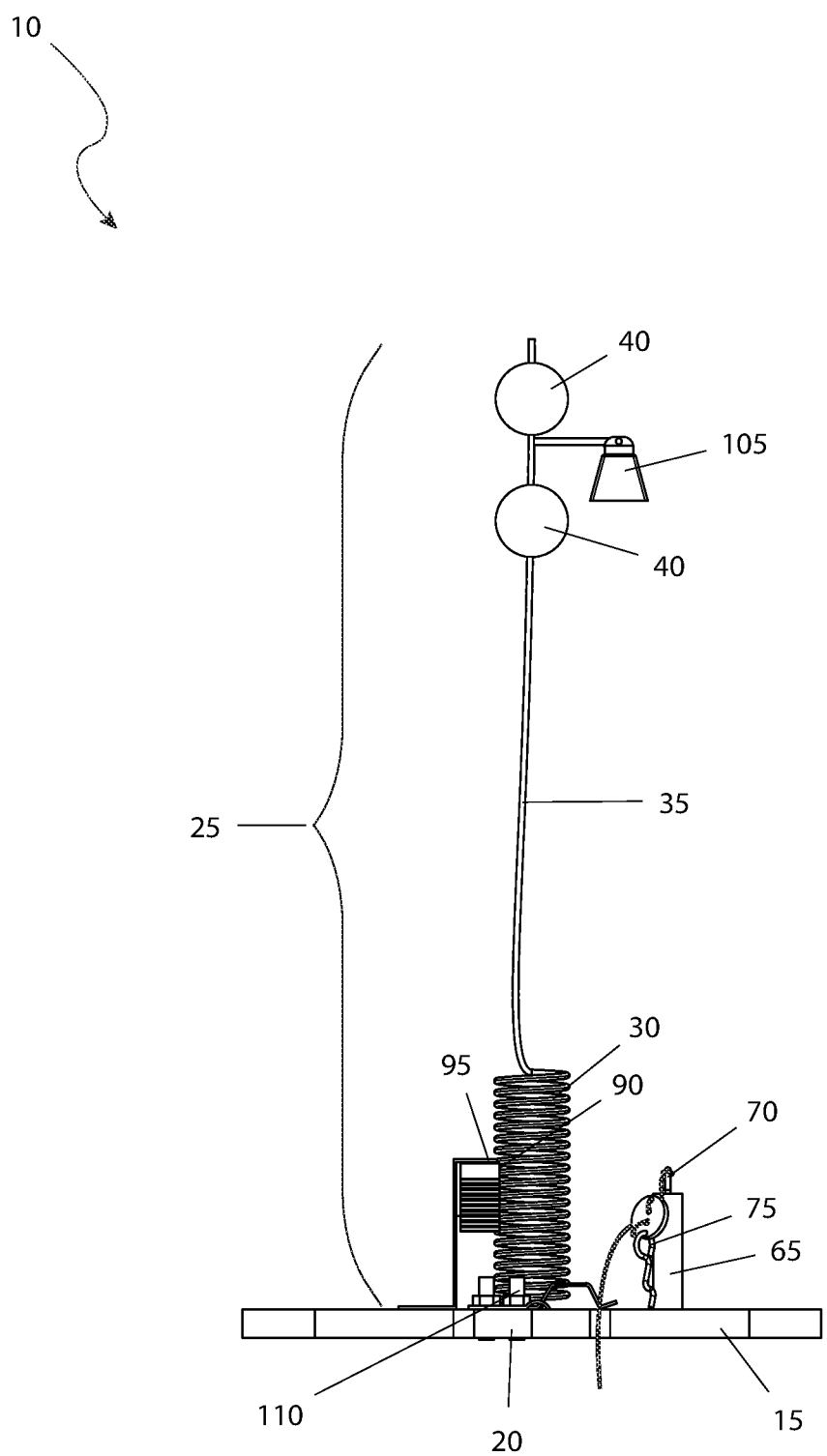
FIG. 4 is an end view of the ice fishing rod holding device, according to the preferred embodiment of the present invention.

Referring next to FIG. 4, an end view of the device 10, according to the preferred embodiment of the present invention is disclosed. This figure provides clarification of the position of the visual indicator 25 in relationship to the slot 20 of the body 15. The locking hook 80 allows for securement of the fishing line 135 (as shown in FIG. 2) to the trigger pin 75. The attachment chain 70, connecting the trigger pin 75 and the support stanchion 65, prevents accidental loss of the trigger pin 75.

Figure 5:
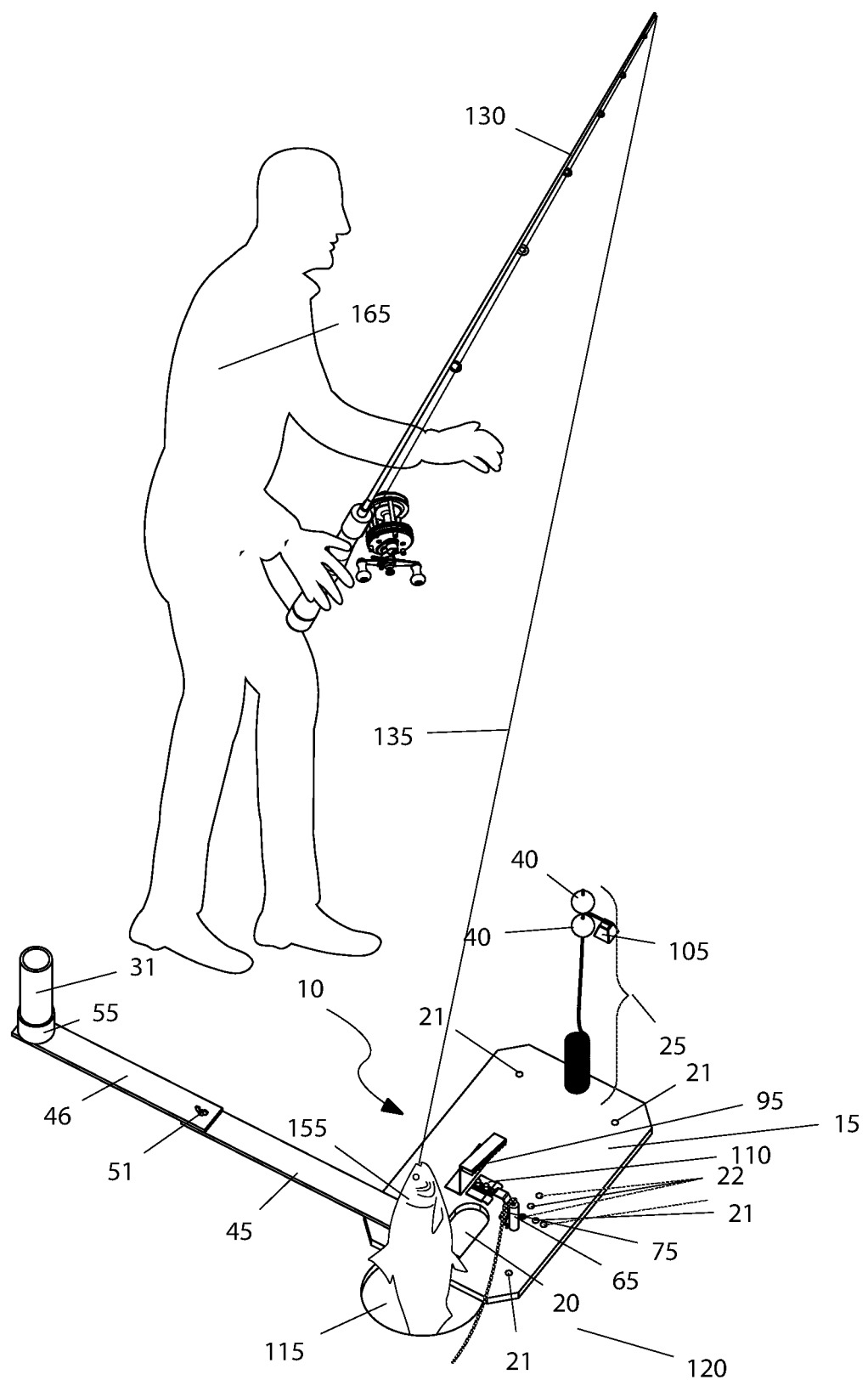
FIG. 5 is a perspective view of the ice fishing rod holding device, shown in a utilized, but post-activated state, according to the preferred embodiment of the present invention.
Figure 6:
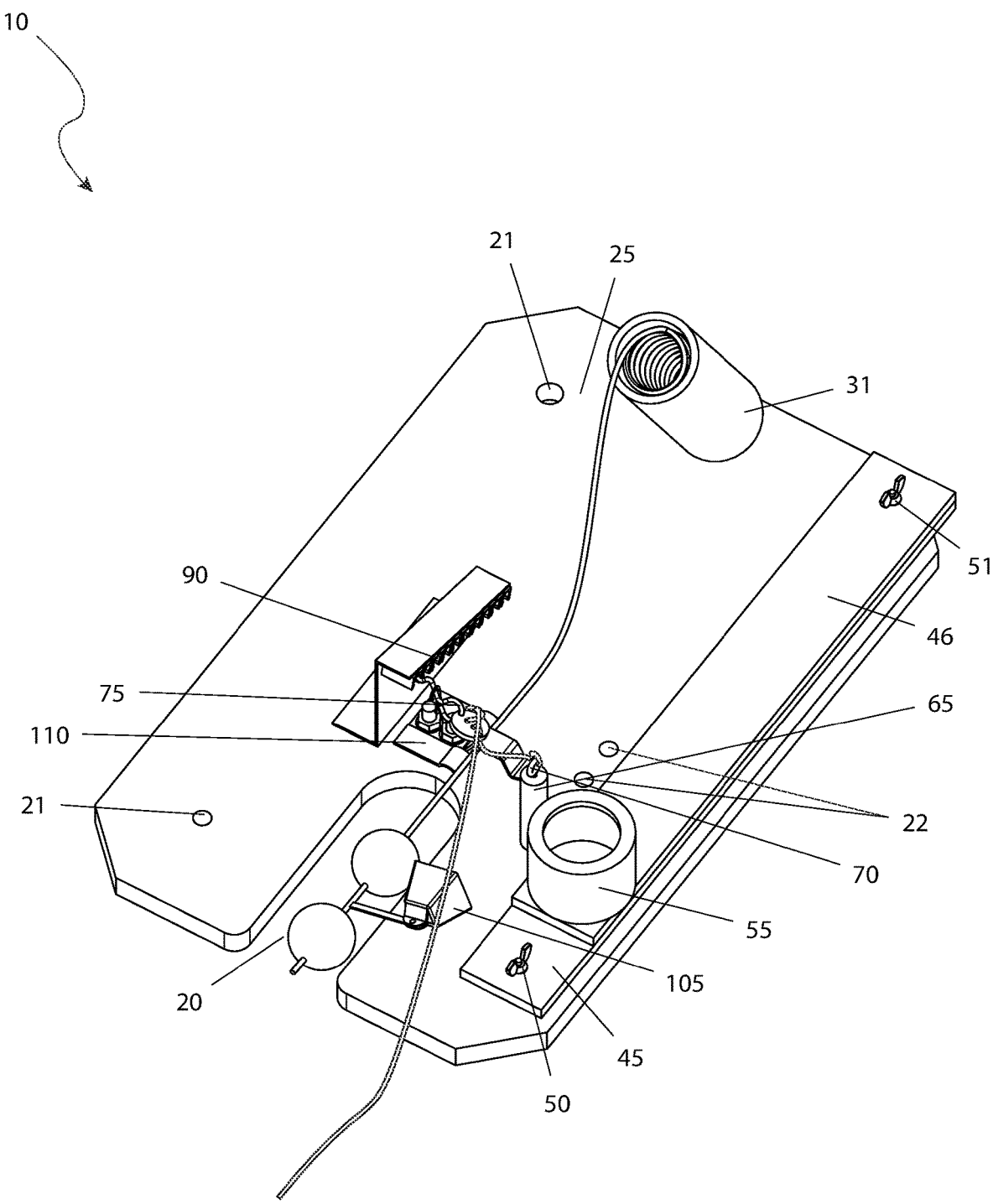
FIG. 6 is a perspective view of the ice fishing rod holding device, shown in a utilized, but pre-activated state in an alternate position than FIG. 2, according to the preferred embodiment of the present invention.

Referring now to FIG. 5, a perspective view of the device 10, shown in a utilized, but post-activated state, according to the preferred embodiment of the present invention is depicted. This configuration of the device 10 is immediately after a fish 155 has been caught on the fishing line 135. As the fish 155 pulls the fishing line 135, the resultant pressure on the trigger pin 75 releases it from the release position 90 (as shown in FIGS. 1 and 3). This action results in a rearward and upward movement of the visual indicator 25 along the visual indicator travel path "c" 100. The indicator balls 40 are now in an upright position and the audible alarm 105 alerts a user 165, who may ascertain a specific device 10 has been activated. The user 165 then removes the fishing pole 130 from the fishing rod holder 55 and proceeds to reel in the fish 155 in a customary and expected manner.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as sporting goods stores, outdoor equipment retailers, mail order and internet supply houses and the like.

After procurement and prior to utilization, the device 10 would be prepared in the following manner: the device 120 is placed adjacent a hole 115 in the ice 120 such that the slot 20 is vertically aligned therewith; the first and second swing arms 45, 46 are positioned as desired via the arm swivel travel path "a" 60 and arm swivel travel path "b" 61; the fishing pole 130 would be placed in the fishing rod holder 55 through the spring cover 30, the fishing line 135 would be routed through the second end of the locking hook 80; the first end of the locking hook 80 is hooked onto the trigger pin 75, the visual indicator 25 would be moved along the visual indicator travel path "c" 100 and secured under the trigger pin 75; the pin end 85 of the trigger pin 75 would be placed in the desired release position 90 on the release panel 95 with the rod 35 of the visual indicator 25 secured underneath; and the fishing line 135 is routed into the hole 115, as shown in FIG. 2. At this point in time, the device 10 is ready for activation by a fish 155 that bites the hook at the end of the fishing line 135.

When a fish 155 has been caught on the fishing line 135, the resultant pressure on the trigger pin 75 releases it from the release position 90. This action results in movement of the visual indicator 25 along the visual indicator travel path "c" 100, such that the indicator balls 40 are now in an upright position and the audible alarm 105 can alert a user 165, who may ascertain a specific device 10 that has been activated. The user 165 then removes the fishing pole 130 from the fishing rod holder 55 and proceeds to reel in the fish 155 in a customary and expected manner. Should continued use of the device 10 be desired, the device 10 is reset as aforementioned described.

When usage of the device 10 is no longer desired, the first swing arm 45 and second swing arm 46 are moved along the arm swivel travel path "a" 60 and arm swivel travel path "b" 61, respectively, so each swing arm 45, 46 is resting against the body 15. The visual indicator 25 is moved along the visual indicator travel path "c" 100 and secured in place to the clip 110, and the spring cover 31 is removed from the fishing rod holder 55 and placed over the spring 30. This action reduces the overall size and volume of the device 10 allowing it to be stored in a five-gallon (5 Gal.) pail, hung on a wall, stored on a shelf, or similar location until needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An ice fishing rod holding device, comprising:
a body having a slot disposed on a first end, the body includes a plurality of first apertures and a plurality of second apertures disposed thereon;
a visual indicator disposed on an opposite end of the slot, the visual indicator includes a spring, a rod and at least one indicator balls;
a first swing arm disposed on a first side of the body, the first swing arm having a first side connected to the ice fishing rod holding device by a first pivot means through one of the first apertures or the second apertures, and the first swing arm moves along an arm swivel travel path;
a second swing arm disposed on an opposite second end of the first swing arm, the second swing arm having a second end connected to the ice fishing rod holding device by a second pivot means through one of the desired of the first apertures or the second apertures, and the second swing arm moves along an arm swivel travel path;
a support stanchion disposed on top of the body on one side of the slot, the support stanchion is attached to one of the second apertures;
an attachment chain mechanically connected on top of the support stanchion at a first end and a second end of the attachment chain is connected to a trigger pin;
a locking hook having a first end capable of being hooked on to the trigger pin and a second end capable of securing to a fishing line;
a pin end of the trigger pin connected into one of ten release positions on a release panel, the release panel is attached to one of the first apertures;
a spring cover freely resting on the body covering a spring portion of the visual indicator when the ice fishing rod holding device is in storage; and
a rod having a first end affixed to the spring, the spring is an extension thereof.

2. The ice fishing rod holding device, according to claim 1, wherein the visual indicator is bent over along a visual indicator travel path but secured in a clip during storage.

3. The ice fishing rod holding device, according to claim 2, wherein the clip is affixed to the body at one of the first apertures.

4. The ice fishing rod holding device, according to claim 2, wherein the clip includes a base plate and a leaf spring that biases downward against the body and incorporates a geometry enabling retention of a portion of the visual indicator.

5. The ice fishing rod holding device, according to claim 4, wherein the clip includes the base plate and a spring clip that biases downward against the body and incorporates the geometry enabling retention of the portion of the visual indicator.

6. The ice fishing rod holding device, according to claim 2, wherein the visual indicator includes the spring which is attached to the body via one of the first apertures but located at an opposite side from the slot.

7. The ice fishing rod holding device, according to claim 2, wherein the first pivot means is selected from the group consisting of a rivet, a screw, a nut, or a thumbscrew.

8. The ice fishing rod holding device, according to claim 1, wherein the opposite second end of the second swing arm includes a fishing rod holder adapted for holding a conventional fishing pole.

9. The ice fishing rod holding device, according to claim 1, wherein the first and second swing arms are motioned and an opposite end of the arm swivel travel path and arm swivel travel path reside against the body having a reduced overall footprint allowing for compact storage of the ice fishing rod holding device.

10. The ice fishing rod holding device, according to claim 1, wherein the attachment chain connecting the trigger pin and the support stanchion, prevents accidental loss of the trigger pin.

11. The ice fishing rod holding device, according to claim 1, wherein the first end is capable of being hooked on to the trigger pin at its midpoint.

12. The ice fishing rod holding device, according to claim 1, wherein the visual indicator is bent over along a visual indicator travel path and secured in place under the trigger pin connected to a release position.

13. The ice fishing rod holding device, according to claim 12, wherein the release positions that are near the slot will have a lowered resistance to release and a quicker release at a given line pressure.

14. The ice fishing rod holding device, according to claim 1, wherein the release positions nearer the visual indicator will have a higher resistance to release and a slower release at a given line pressure.

15. The ice fishing rod holding device, according to claim 1, wherein the spring cover is a cylindrical element with a pair of open ends.

16. The ice fishing rod holding device, according to claim 1, wherein attached adjacent to the opposing second end of the rod is the at least one indicator balls and at least one audible alarm and the at least one indicator balls are larger than the rod and have a visually appealing color applied onto them.

17. The ice fishing rod holding device, according to claim 16, wherein the audible alarm is a striking element and a bell that creates an audible sound when motioned.

18. The ice fishing rod holding device, according to claim 1, wherein the ice fishing rod holding device is stored by hanging on a wall of an ice shanty, a fishing hut, a garage, or a storage shed via one of the first apertures.

19. The ice fishing rod holding device, according to claim 1, wherein the ice fishing rod holding device is stored in a 5 Gal. pail for protection from damage.

* * * * *